No. 759,518.  
Patented May 10, 1904.

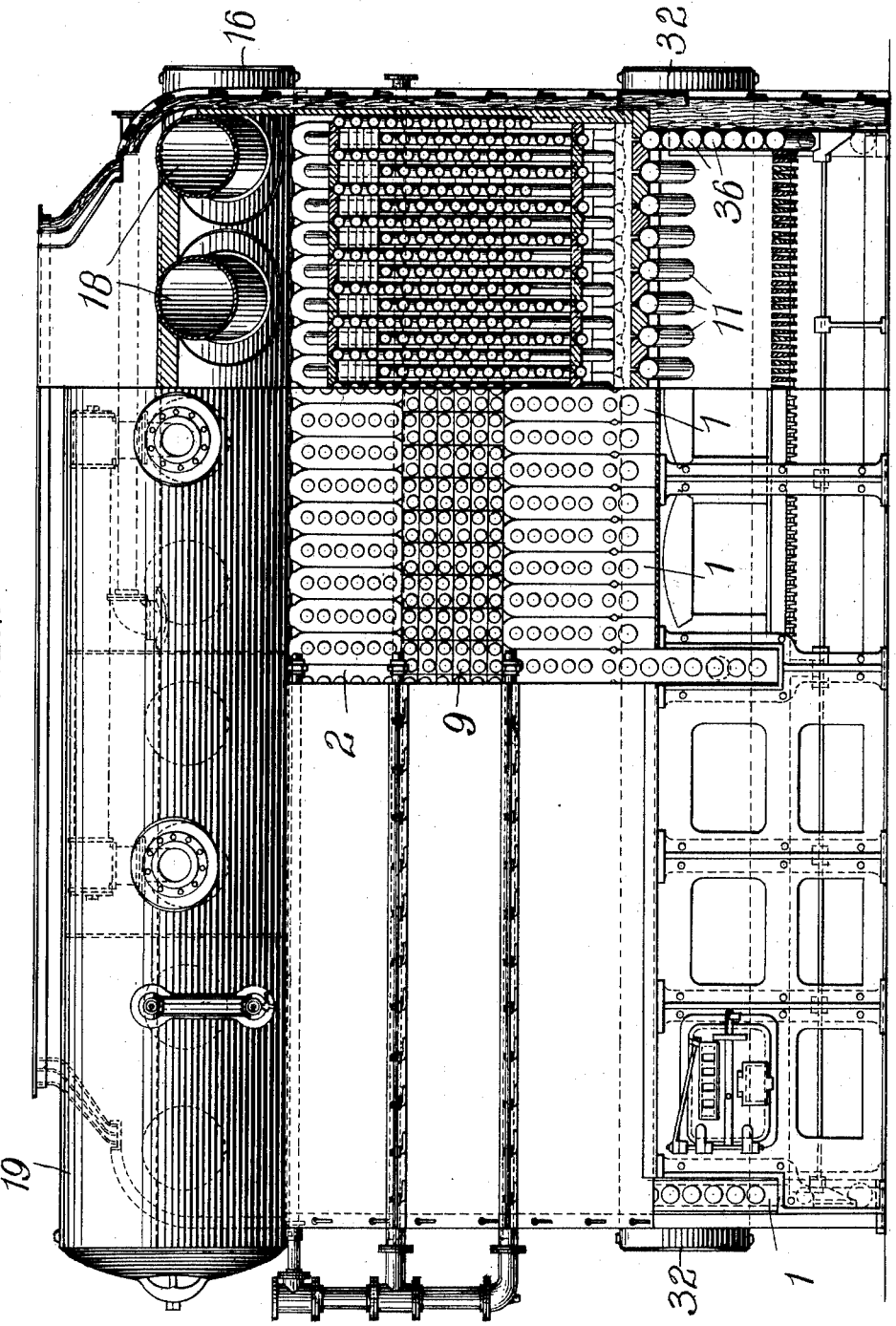

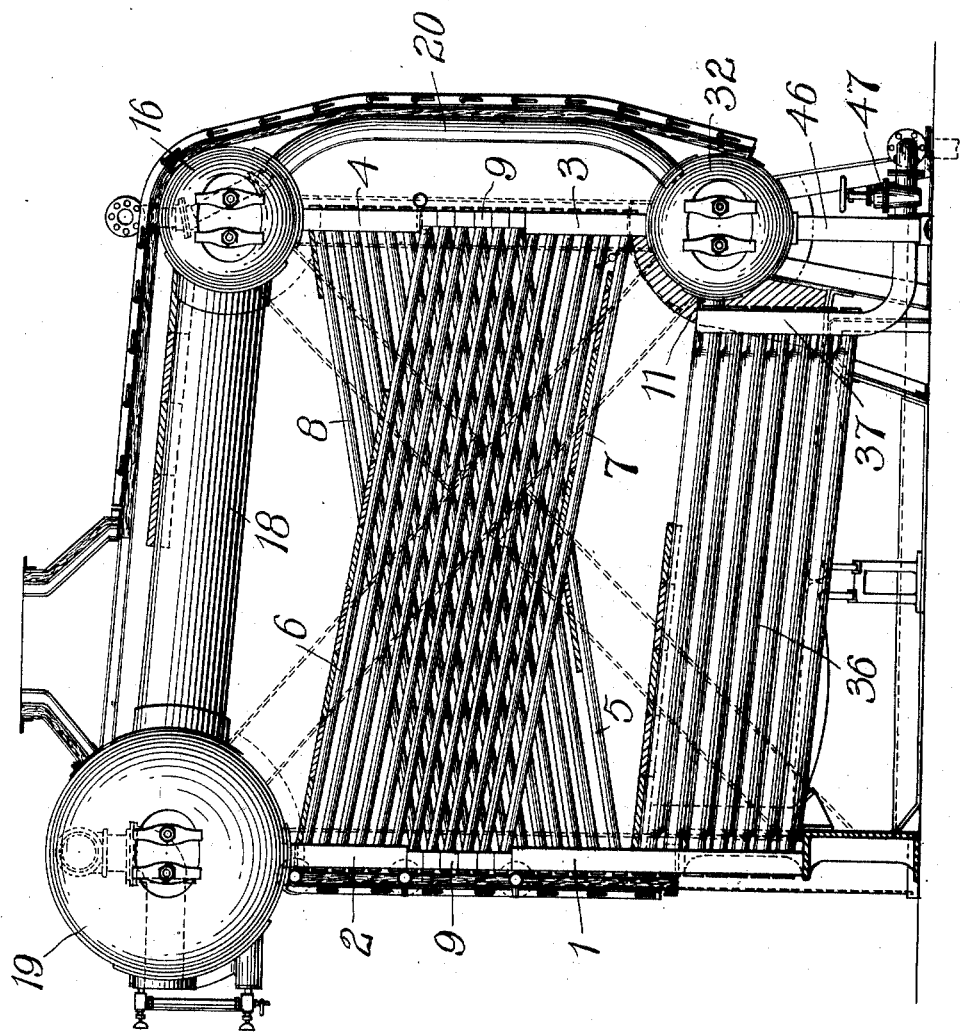

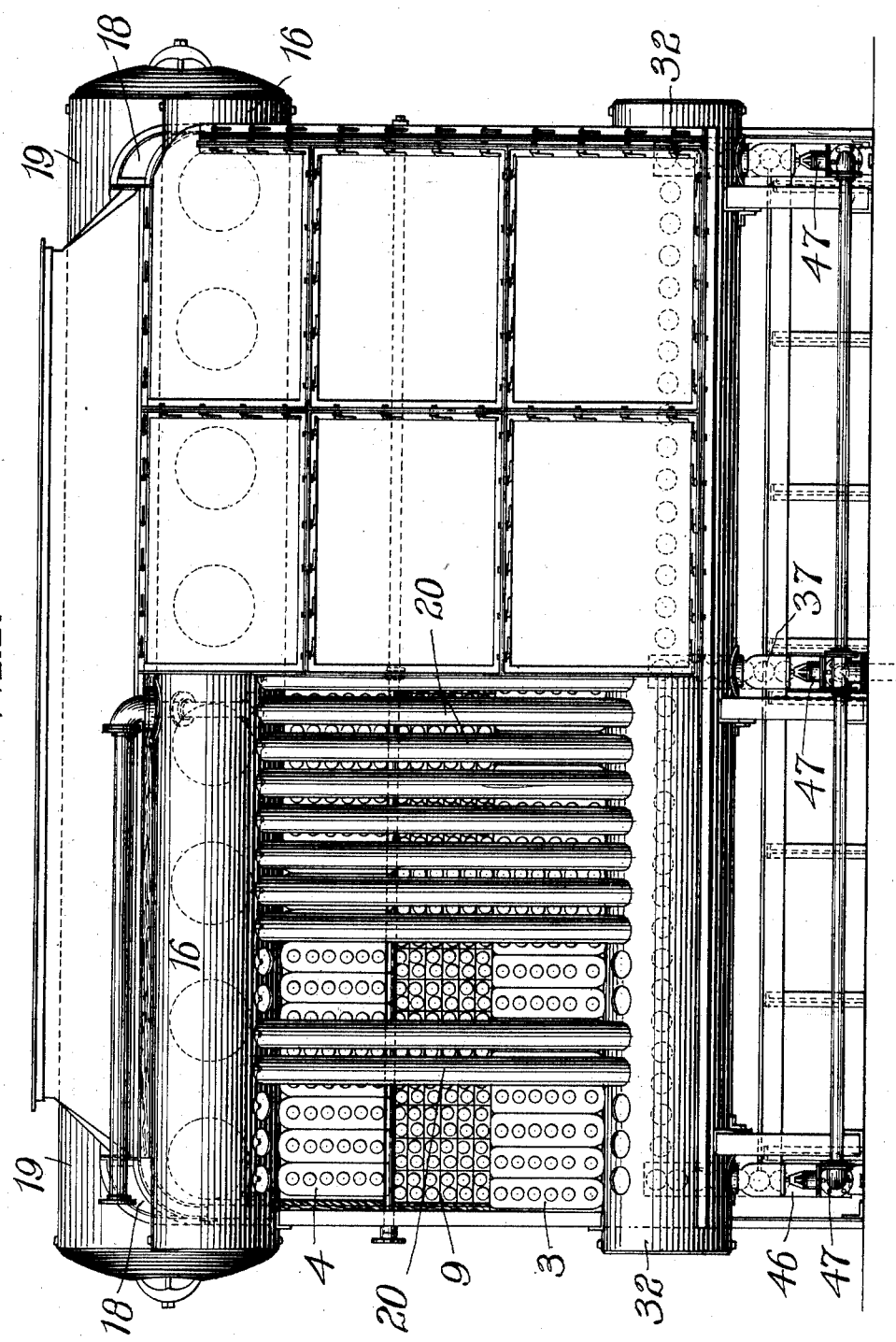

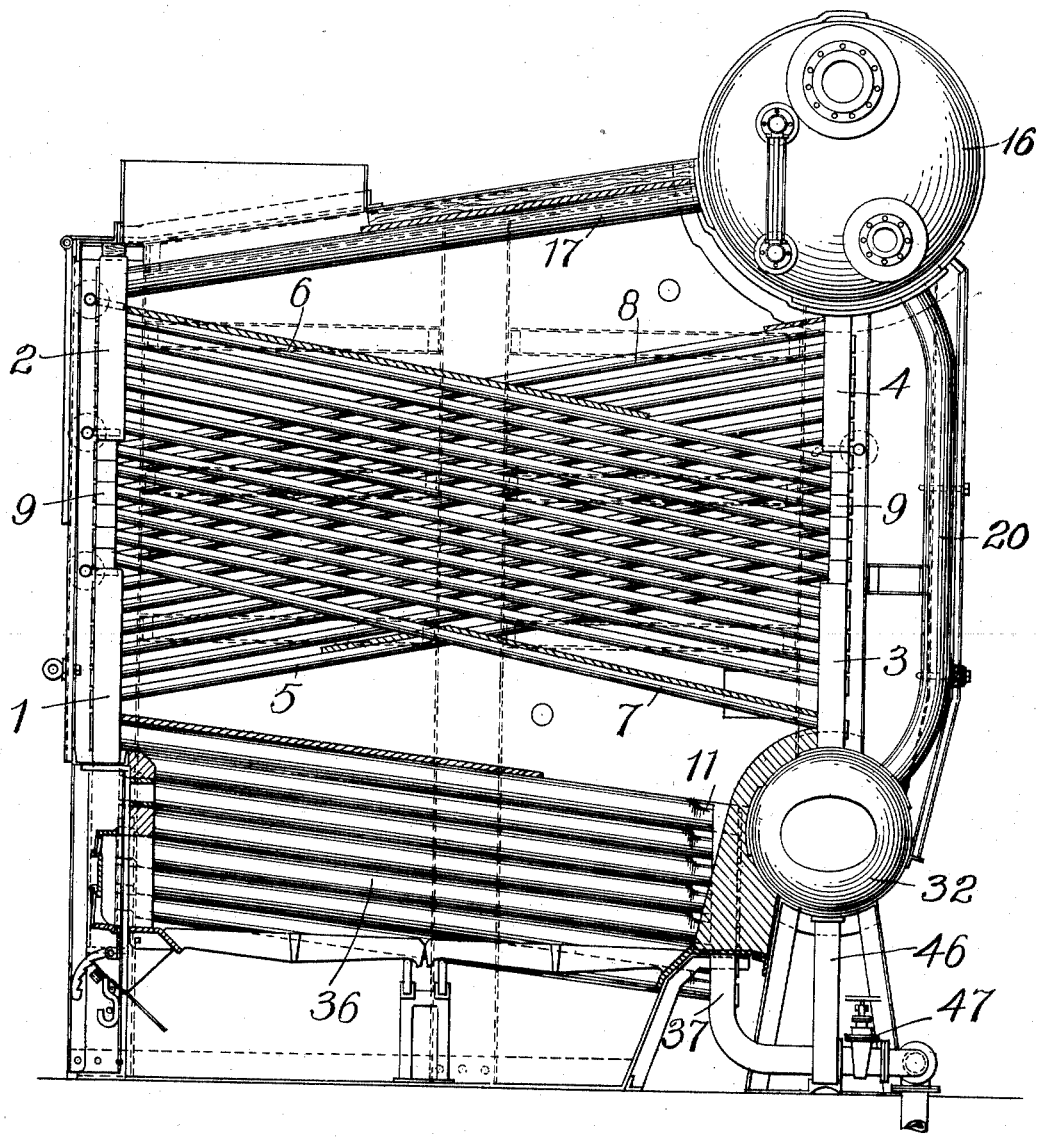

UNITED STATES PATENT OFFICE.

ARCHIE G. HOHENSTEIN, OF NEW HAVEN, CONNECTICUT.

STEAM-BOILER.

SPECIFICATION forming part of Letters Patent No. 759,518, dated May 10, 1904.

Application filed June 1, 1903. Serial No. 159,682. (No model.)

*To all whom it may concern:*

Be it known that I, ARCHIE GERRY HOHENSTEIN, a citizen of the United States, residing at New Haven, in the county of New Haven and State of Connecticut, have invented or discovered certain new and useful Improvements in Steam-Boilers, of which improvements the following is a specification.

In the application of even date herewith, Serial No. 159,681, I have shown and described certain improvements in the class or kind of water-tube boilers forming the subject-matters of patents granted to me, the improvements described in said applications having as one of their objects the provision of water-walls for the fire-boxes of the style of boiler disclosed in said Patents Nos. 661,528 to 661,534 of November 13, 1900.

The improvements described in this application have as their object the provision of water-walls for fire-boxes for the style of boiler shown and described in Letters Patent No. 661,531.

The invention is hereinafter more fully described and claimed.

In the accompanying drawings, forming a part of this specification, Figure 1 is a front elevation of my improved boiler. Fig. 2 is a sectional elevation of the same. Fig. 3 is a rear elevation; and Fig. 4 is a view similar to Fig. 2, illustrating a modified form of boiler.

In the practice of my invention each of the lower front headers 1 is connected by two series of tubes 5 and 6 with a corresponding upper front header 2, which in turn is directly connected to the upper front drum 19. Each of the lower rear headers 3, which have their lower ends connected to the lower rear drum 32, is connected by two series of tubes 7 and 8 to a corresponding upper rear header 4, and these headers are in turn connected to the upper rear drum 16. The two series of tubes 5 and 6 are connected together by junction-boxes 9, arranged in the plane of the rear headers, and the tubes of the series 7 and 8 are similarly connected by junction-boxes 9, arranged in the plane of the front headers. The upper drums 19 and 16 are connected together by a series of cross-tubes 18, and the upper rear drum is connected by a series of downtakes 20 to the lower rear drum 32. The lower rear drum is also connected by a series of tubes 11 with the lower ends of the lower front headers. In this construction two systems of circulation are provided for, both starting from the lower rear drum 32, the one passing by the tubes 11 to the lower front headers, thence by the tubes 5 and 6 to the upper front headers and to the drum 19. The other system starts from the drum 32 and passes thence by the lower rear headers 3, tubes 7 and 8, and upper rear headers 4 to the upper rear drum, where the two circulations unite.

In order to increase the heating-surfaces of the boiler, I provide end walls for the fire-box, said end walls being formed by a series of tubes 36, connecting the extensions of the headers at the ends of the lower front series of headers 1 to rear-headers 37, arranged at the sides of the boiler and immediately in front of the drum 32. These rear water-wall headers are provided with rearward extensions which are connected to the lower drum 32 by drop-pipes 46, as clearly shown in Figs. 2 and 3. Where it is desirable to divide the fire-box into two or more sections, one or more of the intermediate lower front headers 1 may be extended down, as shown in Fig. 1, and connected by a similar series of tubes 36, extending back through the fire-box to an intermediate water-wall header 37. These extensions of the lower headers 1 are such that the water-wall 36 will extend from the plane of the cross-tubes 11 to or approximately to the level of the grate-bars. The drop-pipes connecting the drum with the water-wall headers are connected to suitable valve mechanisms 47 and can be utilized for blowing off the boiler, the sediment, &c., passing from the drum 32 into the drop-pipes, thence can be removed by the blow-off. It will be observed that as the headers 37 are connected to the drum 32 and by the water-wall tubes 36 to the extensions of this lower front header a third or shunt system of circulation is formed, having its origin at the same point as the other two systems—*i. e.*, the drum 32—and joining with one of the other systems in the lower front headers.

These three systems have a common return in the downtakes 20. This triple circulation is characteristic not only of the construction shown and described herein, but also of other constructions—such, for example, as those shown in applications Serial Nos. 159,681 and 159,683, filed of even date herewith. Hence as regards the terms of the broad claims I do not limit myself to the specific construction shown herein.

As shown in Fig. 4, the upper front drum may be omitted, in which case the upper front headers are connected directly to the upper rear drum 16 by tubes 17, forming parts of one of the circulating systems.

I claim herein as my invention—

1. In a water-tube boiler the combination of an upper drum, a lower drum, said drums being arranged in or approximately in the same vertical plane, two series of tubes extending from the lower drum and connected to the upper drum, downtakes connecting the upper and lower drums, and water-walls at opposite sides of the fire-chamber and connected to the upper and lower drums, substantially as set forth.

2. In a water-tube boiler, the combination of three drums, two of said drums being connected and arranged in or approximately in the same horizontal plane above the other drum, two series of tubes extending from the lower drum and connected respectively to the upper drums, downtakes connecting one of the upper drums to the lower drum, and water-walls connected to the lower drum and to one of said series of tubes, substantially as set forth.

3. In a water-tube boiler, the combination of an upper drum, a lower drum, said drums being arranged in or approximately in the same vertical plane, two series of tubes extending from the lower drum and connected to the upper drum, downtakes connecting said drums, and water-walls connected to the lower drum and to one of said series of tubes, substantially as set forth.

4. In a water-tube boiler, the combination of a series of front headers, two connected series of tubes extending from the rear of the boiler to the front headers, two series of rear headers, two connected series of tubes extending from the front of the boiler to the rear headers, return connections from the upper to the lower headers, one or more water-wall headers arranged at the rear of the boiler, and tubes forming a water-wall connecting the water-wall headers with the front headers, substantially as set forth.

5. In a water-tube boiler, the combination of three drums, two of said drums being connected and arranged in the same horizontal plane above the other drum, two series of front headers connected respectively to the lower drum and one of the upper drums, two connected series of tubes extending from the rear of the boiler to said headers, two series of rear headers connected respectively to the lower drum and to the second upper drum, two connected series of tubes extending from the front of the boiler to said rear headers, water-wall headers arranged at the rear of the boiler, and tubes extending from the water-wall headers to extensions of the lower series of front headers, substantially as set forth.

6. In a water-tube boiler, the combination of two connected series of tubes extending with opposite inclinations across the boiler and forming one line or system of circulation, two connected and oppositely-inclined series of tubes extending across the boiler forming a second line or system of circulation, said systems having a common origin and uniting at or near the top of the boiler, return-tubes connecting the point of junction with the point of origin of the circulation, and water-wall tubes forming a third or shunt system of circulation and connected to the other systems, substantially as set forth.

In testimony whereof I have hereunto set my hand.

ARCHIE G. HOHENSTEIN.

Witnesses:
DARWIN S. WOLCOTT,
J. C. DAVIDSON.